United States Patent [19]

Kaneda et al.

[11] Patent Number: 4,920,369
[45] Date of Patent: Apr. 24, 1990

[54] LENS POSITION CONTROL DEVICE
[75] Inventors: Naoya Kaneda; Hiroyuki Wada; Masahide Hirasawa; Hirofumi Suda, all of Kanagawa, Japan
[73] Assignee: Canon Kabushiki Kaisha, Tokyo, Japan
[21] Appl. No.: 346,630
[22] Filed: May 2, 1989
[30] Foreign Application Priority Data
 May 6, 1988 [JP] Japan .................................. 63-109966
 Jun. 16, 1988 [JP] Japan .................................. 63-149201
[51] Int. Cl.$^5$ .............................................. G03B 3/00
[52] U.S. Cl. .................................... 354/400; 354/402; 354/403
[58] Field of Search ............... 354/400, 402, 406, 407, 354/408, 195.1, 409, 403
[56] References Cited
 U.S. PATENT DOCUMENTS
 4,841,325 6/1989 Hoshino et al. ...................... 354/400

Primary Examiner—Michael L. Gellner
Assistant Examiner—Cassandra C. Spyrou
Attorney, Agent, or Firm—Fitzpatrick, Cella, Harper & Scinto

[57] ABSTRACT

A lens position control device for a lens system, the lens system including a variator and a compensator which also serves as the focusing lens, includes a detecting circuit for detecting the position of the variator and the focusing lens, a memory for storing information representing a plurality of values of the speed of movement of the focusing lens determined depending on the positions of the variator and the focusing lens and a predetermined value of the speed of movement of the variator, and a control circuit responsive to zoom actuation for controlling the movements of the variator and the focusing lens. Depending on the information representing the positions of the variator and focusing lens determined by the detecting circuit, the control circuit selects a specific one of the values of the moving speed from the memory so that the focusing lens moves at the particular speed, and the movements of the variator and the focusing lens are started at almost the same time.

13 Claims, 11 Drawing Sheets

FIG.7
(PRIOR ART)
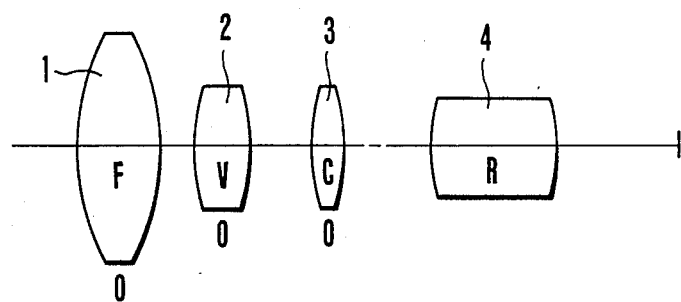
FIG.8(A)
(PRIOR ART)
FIG.8(B)
(PRIOR ART)
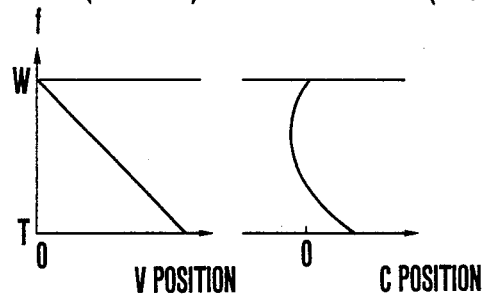
FIG.9
(PRIOR ART)
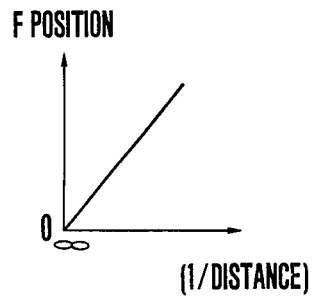

(a)
(b)
(c)
(d)
(e)

POSITION OF LENS GROUP FOR FOCUS ADJUSTMENT 4,920,369

LENS POSITION CONTROL DEVICE

BACKGROUND OF THE INVENTION

1. Field of the Invention

This invention relates to a lens position control device for use in cameras, observation instruments, etc.

2. Description of the Related Art

Lenses adapted to be built in video cameras are generally of the type having four constituent lens groups as shown in FIG. 7.

In FIG. 7, 1 is a lens group (F) for focusing arranged at the front end of the lens barrel; 2 is a variator lens or lens group (V) for varying the image magnification; 3 is a compensator lens or lens group (C) for causing the sharply focused object to be properly positioned after the image varying operation; and 4 is a relay lens or lens group (R) for forming an object image. Incidentally, when in the position of FIG. 7, the zoom lens has its focal length set at the wide-angle end (shortest) and is focused on an infinitely distant object. For the purpose of explaining the movement of each lens group below, the places where the lens group 1 (F), the lens group 2 (V), and the lens group 3 (C) take when in this position are considered here to be at the zero point.

FIGS. 8(A) and 8(B) through FIG. 10 show the movement relationships of the aforesaid lens groups 1, 2 and 3 (F, V, C) with respect to the variation of the focal length of the entire system or the object distance. In the following, by reference to these figures, the features of the zoom lens will be described.

FIG. 8(A) is a graph with the lens group 2 (V) axially moved a distance shown in the abscissa to vary the focal length, f, of the zoom lens shown in the ordinate. FIG. 8(A) shows how the focal length f varies when the lens group 2 (V) moves, where W represents the wide-angle end at which the focal length of the zoom lens becomes shortest, and T represents the telephoto end at which the focal length of the zoom lens becomes longest.

FIG. 8(B) is a graph depicting the axial movement of the lens group 3 (C) along the abscissa and the focal length f of the zoom lens along the ordinate, FIG. 9(B) shows the variation of the distance the lens group 3 (C) has to move from the point 0 respect to the variation of the focal length.

FIG. 9 is a graph showing in the abscissa the reciprocal of the distance (in meters) from the camera to an object to be photographed, and showing in the ordinate the distance the lens group 1 (F) axially moves forward from the point 0. FIG. 9 shows the way in which the position of the lens group 1 varies with the variation of the object distance.

FIG. 10 is a graph showing in the ordinate the distance the lens group 1 (F) axially moves forward to effect focusing, and showing in the abscissa the focal length of the zoom lens FIG. 10 shows the relationship of the start point of the lens group 1 (F) with the focal length f at object distances of 1 m, 2 m, 3 m and infinity.

From all the above-identified figures, it is understandable that the publicly known zoom lens has the following features. That is, as is apparent from FIG. 9 and FIG. 10, in a case where the object distance does not change, the variation of the focal length by zooming does not require that the lens group 1 (F) be moved. Therefore, the lens group 2 (V) and the lens group 3 (C) may be interlocked according to the features shown in FIGS. 8(A) and 8(B). Thus, the position control of each lens group is relatively simple. Hence position control can be accomplished by cams or like mechanical control means.

FIG. 11 is a sectional view showing an interlocking mechanism for the lens group 2 (variator lens) and the lens group 3 (compensator lens) of the publicly known zoom lens. In FIG. 11, a lens group holder 5 containing the lens group 2 (V), and another lens group holder 6 containing the lens group 3 (C) are guided along a common optical axis by guide bars 7 and 8. A cam sleeve 9 has camming slots bored in the circumferential surface into which pins 5a and 6a (radially outwardly extending from the lens group holders 5 and 6) are inserted. A fixed tube 10 is fitted on the outer diameter of the cam sleeve 9 and is fixed to a stationary member such as the lens barrel. A zoom actuator ring 11 is fixedly secured to the cam sleeve 9 by a connection portion 11a and is fitted on the outer diameter of the fixed tube 10 so that only rotation relative thereto is possible. When zooming, as the zoom actuator ring 11 is rotated, the cam sleeve 9 also is rotated. As a result, the relative position of the pin 5a in the camming slot 9a and the relative position of the pin 6a in the camming slot 9b change to move the lens group holder 5 and the lens group holder 6 axially in differential relation.

However, as is evident from FIG. 9 and FIG. 10, in the conventional zoom lens, to focus on an object at a closest distance (for example, less than 1 m), the amount of forward movement of the lens group 1 (F) must be made great in proportion to the reciprocal of the object distance. Since focusing is effected just in front of the lens, and because the total focusing movement must be increased to almost infinity, it is impossible to take shots at very short distances. This constitutes a serious problem of the conventional zoom lens.

Therefore, in recent years, to make it possible to perform focusing without moving the first lens group 1 (F), a so-called inner focus type of zoom lens has been proposed. An example of this zoom lens is shown in FIG. 12. In this zoom lens, the lens group 1 and a front lens 4A of the relay lens group 4 are arranged not to move (as fixed lenses,) while the lens group 2 (variator) is arranged, likewise as in the former type of zoom lens of FIG. 7, to move when the focal length is changed. Also, a rear lens 4B (RR) of the relay lens group 4 (RR) has the compensating function like that of the compensator lens of the former type of zoom lens. By axially moving that lens 4B similarly to the conventional compensator lens, compensation is accomplished during zooming. And, the lens 4B is further given an additional function of adjusting focus. When performing only focusing, the lens 4B alone is moved.

Also, another example of an arrangement of a zoom lens of the inner focus type is shown in FIG. 15. In this case, four lens groups are used, of which the lens group 2 has the image magnifying function like to the conventional 4-group type of zoom lens of FIG. 7. However, what is different as compared with FIG. 7 is that the lens group 1 is fixedly secured to the fixed lens barrel 101. Because of this, the lens group 3 which would conventionally work only to compensate is obliged to also serve the focusing function.

In zoom lenses having such a lens arrangement, because of the lens group 1 is not movable, focusing can be effected down even to a very short object distance. Yet, since the relationship of the relative positions of the movable lenses, namely, the lens group 2 and the relay rear lens of FIG. 12, or the lens group 3 of FIG. 15 is extremely complicated, a the simple mechanism such as the cam mechanism of FIG. 11 cannot control the lens group 2 and the relay rear lens 4B of FIG. 12 or the lens group 3 of FIG. 15. Therefore, of a zoom lens of having lens arrangement shown in FIG. 12 or FIG. 15 using a mechanical operating means only is very difficult to achieve.

FIG. 13 is a graph depicting the position of the lens group 2 in the abscissa and the position of the relay rear lens 4B (RR) of the relay in the ordinate, representing the relationship of the relative positions of both lenses to each other at every object distance. As is apparent from FIG. 13, the relationship of the relative positions of both lenses changes as the distance of the object changes from infinity, 3 m, 1 m, 0.5 m, 0.2 m, 0.01 m. Therefore, it is understandable that it is impossible to control both lenses by a simple control mechanism such as the cams.

Nevertheless there has recently been made a proposal for employing a control method whereby the relay rear lens 4B alone is controlled relative to the lens group 2 in response to the detection result of whether or not an image is correctly focused on the focal plane in realizing the zoom lens of FIG. 12. And, even a commodity developed based on this proposal has been announced.

FIG. 14(A) schematically shows the lens position control method and lens construction and arrangement employed in that proposal and commodity, including a lens group 1, a lens group 2, a front lens 4A of a relay lens group, a rear lens 4B of the relay lens group, means 12 for sensing an image formed on the focal plane, a focus control (AF) circuit 13 for detecting when the image is in focus and, when it is out of focus, bringing it into focus, and drive means 14 whose operation is controlled by the AF circuit 13 to move the rear lens 4B of the relay lens group to the proper position.

FIG. 14(B) through FIG. 14(D) show an example of the automatic focus adjusting device. In FIGS. 14(B), 17 represents the entire area of a picture frame 17 of the video camera; and 18 represents a region from which a signal is taken out for the distance measuring purpose. Also, the object to be photographed is assumed to have a contrast 19. In FIG. 14(C), supposing that (a) is this contrast portion, then (b) shows a Y signal output, (c) the differentiated value of the Y signal, (d) its absolute value, and (e) a peak-held signal. Here, the height A represents the degree of focus. FIG. 14(D) shows the variation of the height A in the ordinate with the variation of the lens position of the lens group 1 of FIG. 7 or the lens 4B of FIG. 12, where the sharpest focus is established at the position B of the peak.

Incidentally, another improved method is proposed in Japanese Laid-Open Patent Applications Nos. Sho 62-296110, 62-284316 and others. This is to form position information of the variator lens and the compensator which also serves as the focusing lens, or position information of the variator lens and the distance operating member (distance ring), based on which the amount of movement of the variator lens is related to a number of units of movement of the compensator-cum-focusing lens (hereinafter called the "double-purpose" lens), whereby such a relationship is stored in a memory. Thus, each time a distance the variator lens is moved is given, the movement of the double-purpose lens is controlled in accordance with the corresponding number of units read from the memory (and out-of-focus information).

In the publicly known zoom lens and lens position control method shown in FIG. 14(A), if the accuracy and speed of the input signal of the AF circuit 13 from the image sensing means 12 are high, blurring and distortion do not take place in the image formed on the focal plane. But, because in actual practice the possibility of lowering the control accuracy of the rear lens 4B of the relay lens group by the response delay due to the performance of distance measurement in cycles and others, is very high, there is a serious drawback that a large blurring is apt to occur.

Further, in the above-described improved method, because the detection of the predetermined amount of movement of the variator lens becomes a prerequisite for a highly accurate movement of the aforesaid double-purpose lens to be obtained, there is a need to define the amount of movement of the variator lens much more finely than ever. Further, the moving speed of this double-purpose lens must be made faster. Otherwise it would take a long time to correct the produced blurring.

SUMMARY OF THE INVENTION

One aspect of this invention is to provide a lens position control device which enables the lens group which performs not only compensation but also focus adjustment to move at almost the same time when the lens group for varying the image magnification moves, with the advantage that no large blurring takes place.

BRIEF DESCRIPTION OF THE DRAWINGS

FIG. 7 is a block diagram showing the arrangement of the components of the conventional commonly available zoom lens to which the invention cannot be applied.

FIGS. 8(A) and 8(B) are graphs showing the feature of moving the variator lens in the aforesaid common zoom lens and the feature of moving the compensator lens.

FIG. 9 and FIG. 10 are graphs showing the relationship of the position of the lens group 1 of the commonly available zoom lens of FIG. 7 with the object distance.

DETAILED DESCRIPTION OF THE PREFERRED EMBODIMENTS

The invention is next described in connection with an embodiment thereof by reference to FIG. 1 through FIG. 5. First referring to FIG. 2 and FIG. 3, the technical idea which leads to the fundamental principle of the device of the present invention will be described.

Figure 2:
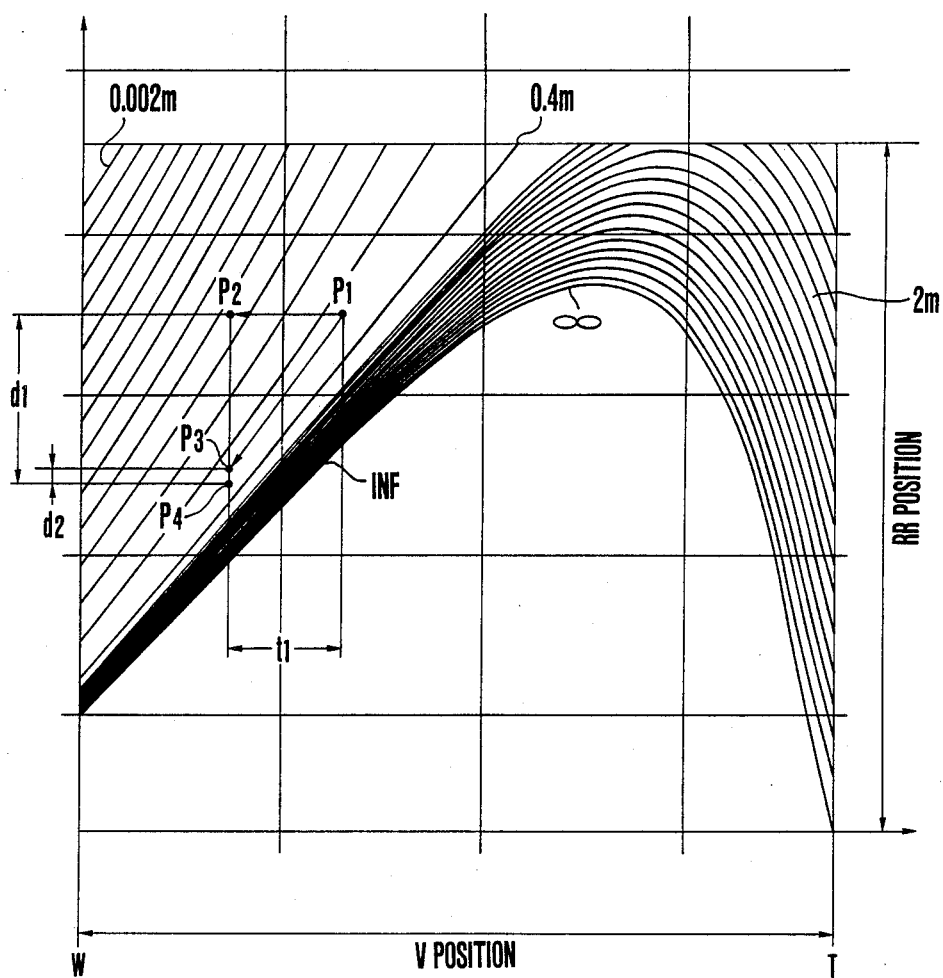
FIG. 2 is a map showing the relationship of the relative position of two movable lenses in a zoom lens at every value of the object distance, and for explaining the principle of the invention.

In FIG. 2 there is shown the variation of the position of the relay rear lens 4B (hereinafter referred simply as the "RR") as a function of the position of the lens group 2 (hereinafter referred simply as the V) in the lens arrangement of FIG. 12 with great number of values of the object distance as parameters in the form of a map.

Suppose the position detecting means has detected the position of the RR and the position of the V individually, and found their relationship at a point $P_1$ in FIG. 2, and the focus control means for controlling this zoom lens measures the object distance cyclicly with a period $t_1$. And an assumption is made that each cycle of distance measurement starts at the same time when the V has been moved. It may then be considered that during the time until the next distance measurement result comes out, the position relationship of the V and RR is changeable up to a point $P_2$.

Unlike above, if the RR is made to move at the same time with movement of the V, then, without the use of a correction in the distance measurement, the relationship of the relative positions of the V and RR will take a value represented by a point $P_3$. As a result, the deviation from the ideal point $P_4$ becomes as small as $d_2$. As the responsiveness of the degree of focus on the focal plane to the position of the V in a region of focal lengths from the point $P_1$ to the point $P_4$ is, for example, 1.0, the diameter of a circle of confusion in terms of the F-number at this time is zero for the point $P_4$, $d_2/F$ for the point $P_3$, or $d_1/F$ for the point $P_2$. Assuming that $d_1 = 5 d_2$, then the degrees of defocus at the points $P_2$ and $P_4$ appear to differ 5 times in the circle of confusion. This movement of the RR is determined under the premise that the object distance remains unchanged. The simultaneous imparting of such a movement into the RR produces a great advantage of improving the rate of occurrence of a blurred image during zooming.

However, to put this idea into practice perfectly, the positions of the V and RR must be accurately sensed to determine the point $P_1$ and then upon correct expectation of when the cam passes the point $P_1$, the required speed of movement of the RR is computed. The performance of these operations necessitates a large scale of computation. As a result, a computing circuit of large scale must be employed. Thus, a problem arises that the cost of the focus control means becomes high.

For this reason, in the present invention, use is made of a method that the map shown in FIG. 2 is divided in both the direction of movement of the V and the direction of movement of the RR into numbers of zones corresponding to the required accuracy of position control, and these zones define respective representative speeds which are stored in a memory of the electronic circuit.

Figure 3:
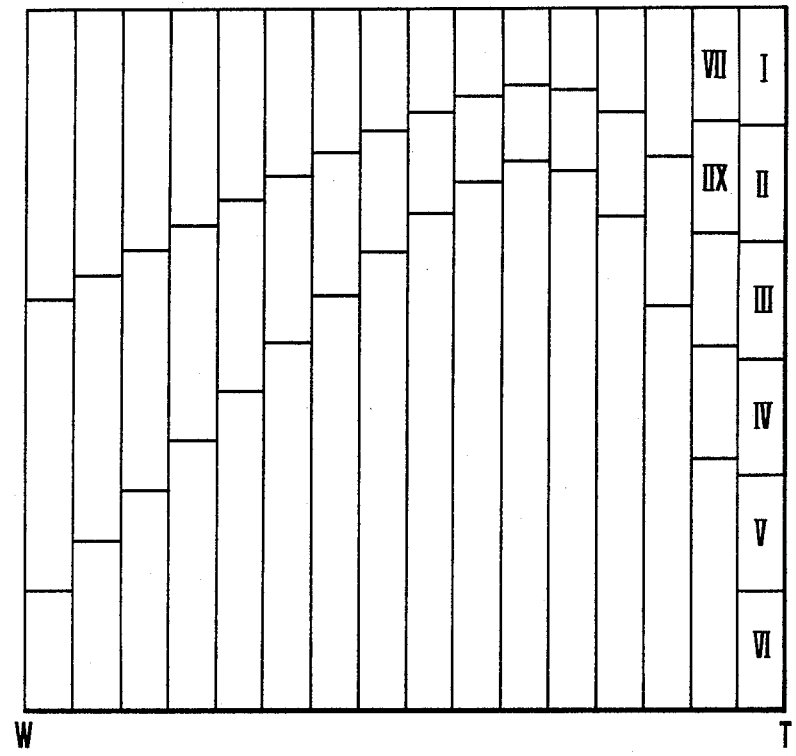
FIG. 3 is a diagram showing the division of FIG. 2 according to the principle of the invention.

FIG. 3 shows an example of the zone division of the inside of the map of FIG. 2. In this example, the range of movement of the V is divided into a large number of zones of equal length, while the range of movement of the RR is divided into a number of zones of different length depending on the number obtained by dividing the difference between the gradients of the loci for infinity and the minimum object distance passing through one zone for the V by a desired field depth.

Figure 4:
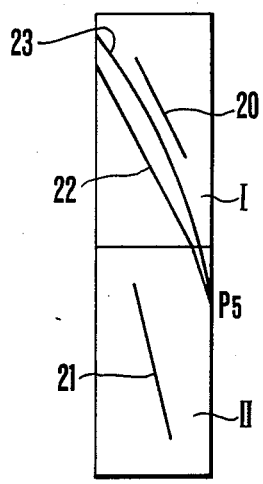
FIG. 4 is a diagram in enlarged scale of part of FIG. 3 for explaining the principle of the invention.

FIG. 4 is a diagram for explaining how to determine the speed of movement of the RR in the zones I and II of FIG. 3 from the relative position curve of the V and RR. In FIG. 4, 23 is a relative position curve passing a point $P_5$ in a case where the object distance remains constant. Line segments 20 and 21 represent gradients of the lens movement in the respective zones. (The gradient may be considered to be the moving speed of the RR when the moving speed of the V is constant.)

On the assumption that the V and RR move from point $P_5$ without the feedback from the AF device, they, so long as in the zone II, move in a locus passing through the point $P_5$ and parallel to the line segment 21, and, when in the zone I, move parallel to the line segment 20, the total locus becoming like 22. The discrepancy between the ideal locus 23 and the actual one 22 gives rise to an error in the position control.

Figure 5:
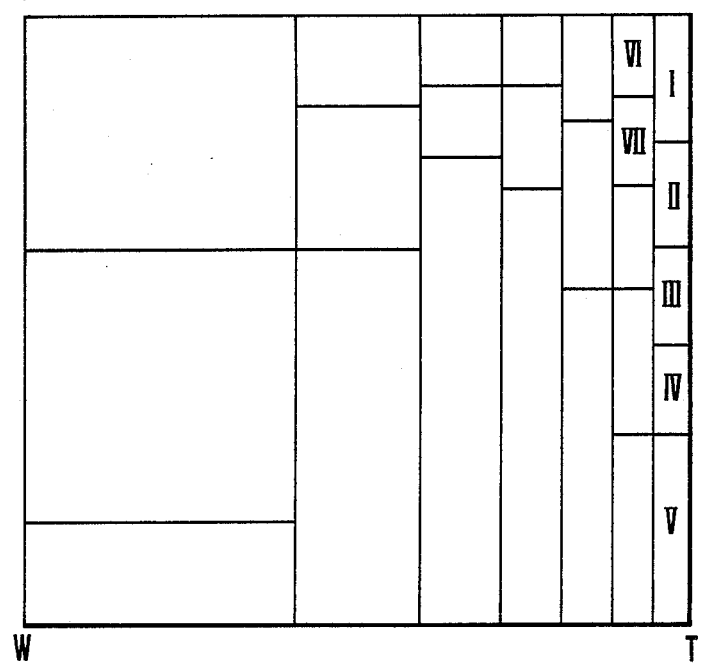
FIG. 5 is a similar diagram to FIG. 3 except that another method of dividing FIG. 2 according to the principle of the invention is shown.

FIG. 5 shows another method of zone division. In this figure, the range in the abscissa is divided by taking into account the discrepancy between the ideal locus and a line approximation. Therefore, as the wide-angle end is approached, the length of one zone gets progressively longer. When using this diagram for controlling the lens position in a similar manner to that described above, it has been found that, though the accuracy of position control is somewhat inferior to the case of FIG. 3, almost as good a result can be obtained.

It has also been discovered by the inventors that the examples of the zone division of FIG. 3 and FIG. 5, even when employed in the 6x class or standard zoom lens, assures a sufficient accuracy. In general, the total or T-W movement of the variator is 20 mm or thereabout, so 1 mm in the length of one zone of the encoder for the variator suffices even in the example of FIG. 3. Therefore, in the invention, the precision of division of the encoder for the variator may be rougher than in the prior art.

In FIG. 6(A), 1, 2, 4A, 4B are the lens groups already described in connection with FIG. 12. The lens group 1 is fixedly mounted in a holder 103 which is screw-threaded into a fixed tube 102 to allow that lens group 1 to take an optimum position and, after adjusted in position, is fixedly secured by a screw fastener 104. The variator 2 is fixedly mounted in a movable ring 105 therefor, and moves in thrust directions (along an optical axis O—O') as guided by a bar 108. Here, the bar 108 has a helical V-groove of certain lead machined in the outer periphery thereof as shown in the figure. A ball (not shown) is pressed against this V-groove by a leaf spring (not shown) fixed to the variator moving ring 105 so that its position is firmly held. This position can be varied by rotating the bar 108 about its own axis with the help of a zoom motor 140 shown in FIG. 6(B). Further, this variator moving ring 105 bears a brush 107 sliding on an encoder substrate 106. These parts constitute an encoder for the variator. An iG meter 109 drives diaphragm blades 111 to control the size of the aperture opening. The lens group 4A is fixed to a barrel 108, while the lens (RR) 4B is mounted on a movable ring 117. This movable ring 117 is formed in unison with a small sleeve 115 whose inner surface is female screw-threaded. A bar 114 having male screw-threads engages the sleeve 115 so that rotation of the bar 114 about its own axis varies the position of the lens group 4B. To rotate this bar 114, a step motor 112 is used in combination with interlocking means of a pulley 113 and an endless V belt 120.

In this example, for the purpose of detecting the position of the lens group 4B which functions both as the compensator and as the focusing lens, the number of input pulses to the step motor 112 may be used. If so, then a necessity arises that when the electric power source is on or off, the lens group 4b is brought to a certain predetermined, say zero, address. In the illustrated embodiment, there is provided a 0 address adjusting cam 121 arranged so that when a portion 122 of the movable ring 117 abuts on it, the position of the step motor 112 is made to be the 0 address.

Figure 6A:
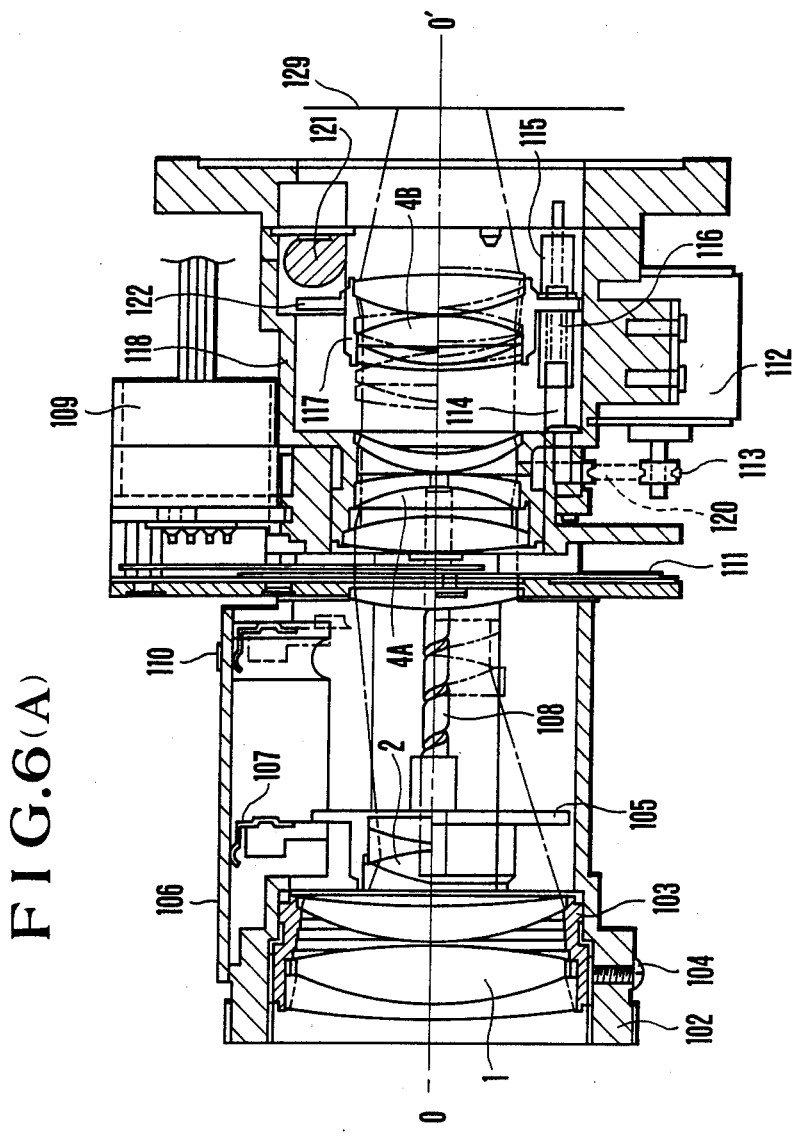
FIG. 6(A) is a longitudinal sectional view of an example of a zoom lens as the optical instrument to which the invention is applied.
Figure 6B:
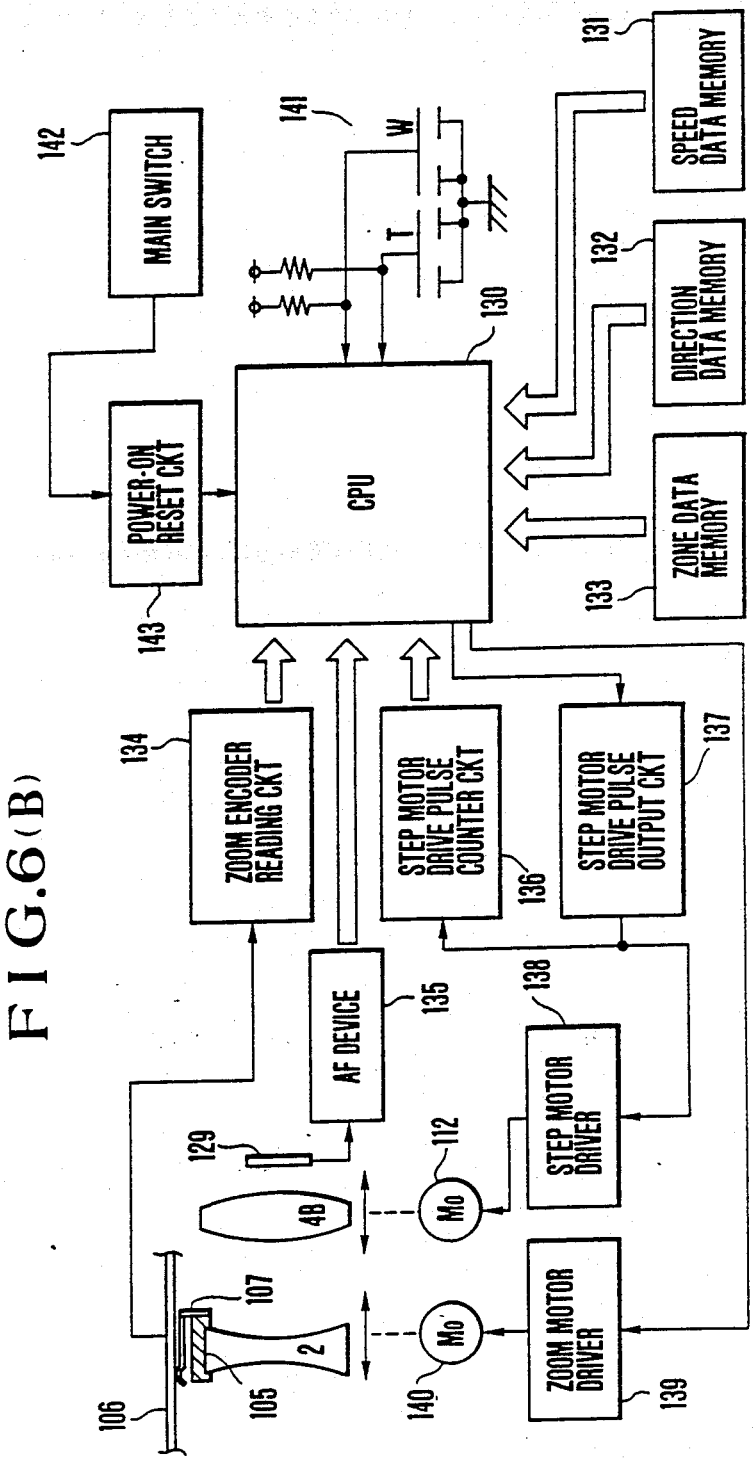
FIG. 6(B) is an electrical circuit diagram of the FIG. 6(A) embodiment.
Figure 10:
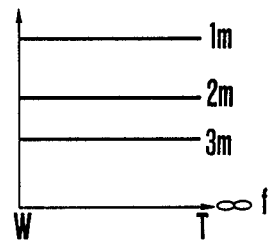
Figure 11:
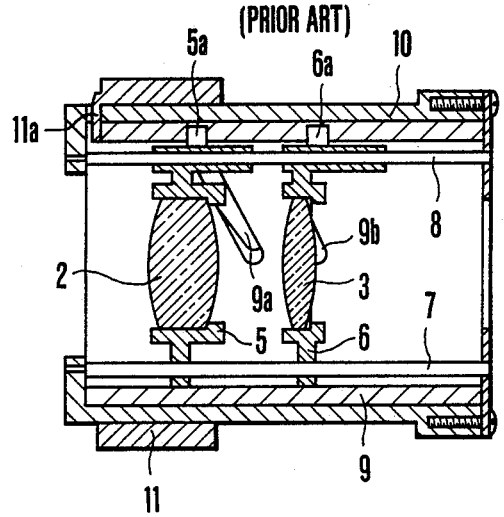
FIG. 11 is a longitudinal sectional view of a control mechanism employed to interlock the variator lens and the compensator lens with each other in the zoom lens of FIG. 7.

FIG. 6(B) shows a circuit to be used in combination with FIG. 6(A). When a main switch 142 is turned on, resetting of the step motor 112 to the 0 address is performed as has been described above by a power-on reset circuit 143. (Concretely speaking, for example, the lens group 4B is forcibly moved to one terminal end for either the minimum object distance or infinity, and that condition is taken as the 0 address.)

141 is a zoom actuation detecting portion. When either of zoom switches (T, W) is operated, an actuating signal is given to a CPU 130. In the CPU 130, the fact that the zoom switch (T, W) has been pushed is taken as a trigger for accepting a signal representing the position of the variator lens 2 from a zoom encoder reading circuit 134 using the aforesaid brush 107 on the substrate 106. Another signal, representing the number of pulses the step motor 112 lies ahead of the reset or 0 position, is transmitted from a step motor drive pulse counter circuit 136 to the CPU 130. From the comparison of these two items of lens position information with the numerical data in a zone data memory 133, the zone is identified, and the speed representative of that zone is read out from a speed data memory 131. Further, depending on the history of the momentary positions of the zoom switches (T, W) of the zoom actuation detecting portion 141, namely, from the wide-angle side to the telephoto side, or from the telephoto side to the wide-angle side, the direction in which the step motor 112 is to rotate is read from a direction data memory 132 into the CPU 130. In the CPU 130, from the contents read out from these data memories and defocus information read in from the AF device 135, the direction and speed at which the step motor 122 is to rotate to drive the lens group 4B, and the direction in which a motor 140 for driving the variator lens 2 is to rotate, are determined by the history of the momentary positions of the zoom switches (T, W). After that, in order that the two motors 112 and 140 start to move at almost the same time, the CPU 130 controls production of its outputs to a step motor drive pulse output circuit 137 and a zoom motor driver 139.

Figure 1:
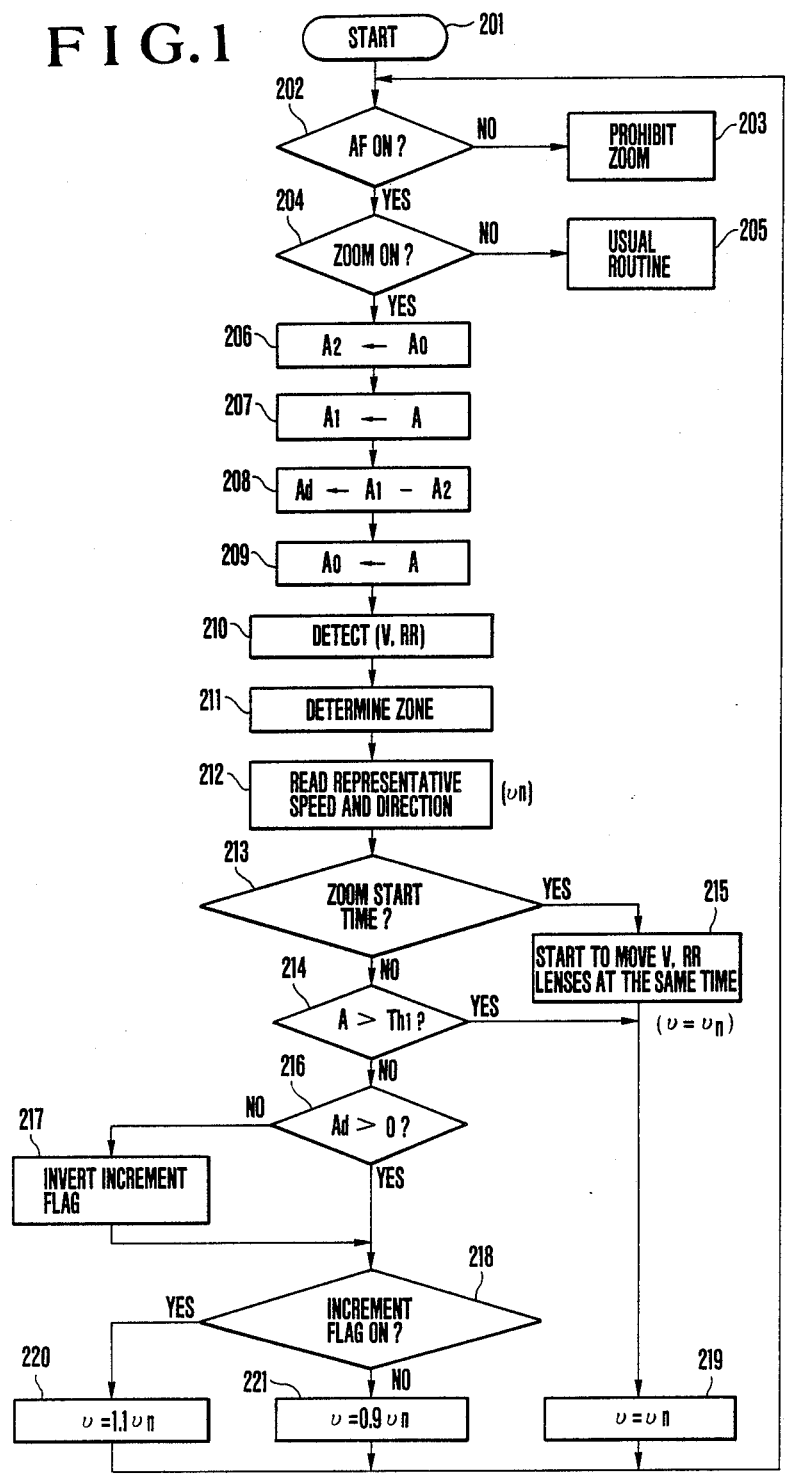
FIG. 1 is a flowchart for the program for the operation of an optical instrument (FIG. 6(A)) to which an embodiment of the device of the invention is applied.

FIG. 1 is a flowchart for the operation of the CPU 130 in the present embodiment described in connection with FIGS. 6(A) and 6(B). This flow completes its one cycle in for example 1/60 sec.

A step 201 begins when the electric power source of the instrument (such as a video camera equipped with the lens to which the invention has been applied), is turned on. At this point in time, the aforesaid step motor 112 is reset by a process (not shown).

After that, whether the AF device is on or off is judged in a step 202. If off, then, because the compensating function does not work, the lens is prohibited from zooming (step 203). If on, the flow advances to a step 204 for detecting whether or not zoom actuation has been for (with the zoom actuation detecting portion 141 of FIG. 6(B)). If no zoom actuation is being performed, the process is branched to an usual distance measuring routine in a step 205.

If a zooming actuation is being performed, the process advances to a step 206 where the previous defocus evaluation result ($A_0$) of the AF device (the content of a register $A_0$) is stored in a register $A_2$. In a case where there is no defocus evaluation result $A_0$ at the zoom start time, the register $A_2$ is set to, for example, $A_2 = 0$. In the next step 207, the defocus A evaluated at present is stored in a register $A_1$. Then $A_1 - A_2$ is computed and its value is stored in a register Ad in a step 208. The present defocus value A is then stored in the register $A_0$ in a step 209. In a step 210, the position of the variator lens 2 and the double-purpose lens group (RR lens) are detected by the zoom encoder and by using the pulses of the step motor 112. Based on this result, a zone to which the point (V, RR) in the map belongs is found out from the zone data memory 133 in a step 211. In the next step 212, the representative speed corresponding to the found zone is read out from the speed data memory 131. This result is assumed to be $vn$. (The speed may be memorized in the form of an input pulse interval in a dimension such as mm/sec.)

Whether or not the process is at the zoom start time is then detected in a step 213. If at the start time, the drive speed $v$ of the motor 112 is set to the value $vn$ (and the speed of the motor 140 for the variator is set to a predetermined constant). The variator lens 2 and the lens group 4B then start to be energized at the same time. This simultaneous movement of these two lenses continues except when the zoom actuation ends or when the variator lens 2 arrives at either one of the terminal ends of a range of movement.

For the second and later cycles of this flow, the step 213 is followed by a step 214. In the step 214, whether or not the evaluated defocus A exceeds an acceptable level $Th_1$ of defocus (FIG. 14(D)) is determined. If $A > Th_1$, it implies that the defocus lies in an allowable range, and the speed $v$ is then set to $v = vn$ in a step 219.

If the defocus is so large that $A \leq Th_1$, whether the Ad is positive or negative is tested in a step 216. $Ad > 0$ implies that the degree of defocus has reduced in a space of 1/60 sec. from the previous cycle to the present cycle, so the increment flag is not altered. In a step 218, therefore, the same determination as in the previous cycle results so that the same value of the speed $v$ as the previous one is set in a step 220 or 221. Now the speed $v$ (under the condition that the defocus is below the level $Th_1$) is represented by $v = k \cdot vn$. The k for the step 220 is denoted by $k_{220}$, and the k for the step 221 by $k_{221}$. Then $K_{220}$ and $k_{220}$ should be related to each other by $k_{220} < 1 < k_{221}$, or $k_{221} < 1 < k_{220}$. (In FIG. 1, they are tentatively taken at $k_{220} = 1.1$ and $k_{221} = 0.9$)

When the defocus intensifies between the previous and present cycles, the increment flag is inverted in the step 217. So a different selection from the previous one is made in the step 218.

Though the foregoing embodiment has been described in connection with the lens type shown in FIG. 12, it is to be understood that the invention is applicable to other lens types such as that shown in FIG. 15.

According to the present embodiment, the defocus that appears owing to the response delay or the like of the output of the focus detecting means and others can be greatly improved. Hence, the invention can provide an optical instrument of higher accuracy. Particularly since the movement of the lens for varying the image magnification can be accompanied with almost simultaneous following-up movement of the lens which functions not only to compensate for the image shift but also to effect focusing, the defocus produced can be minimized, and the speed of variation of the image magnification also can be increased.

Figure 16:
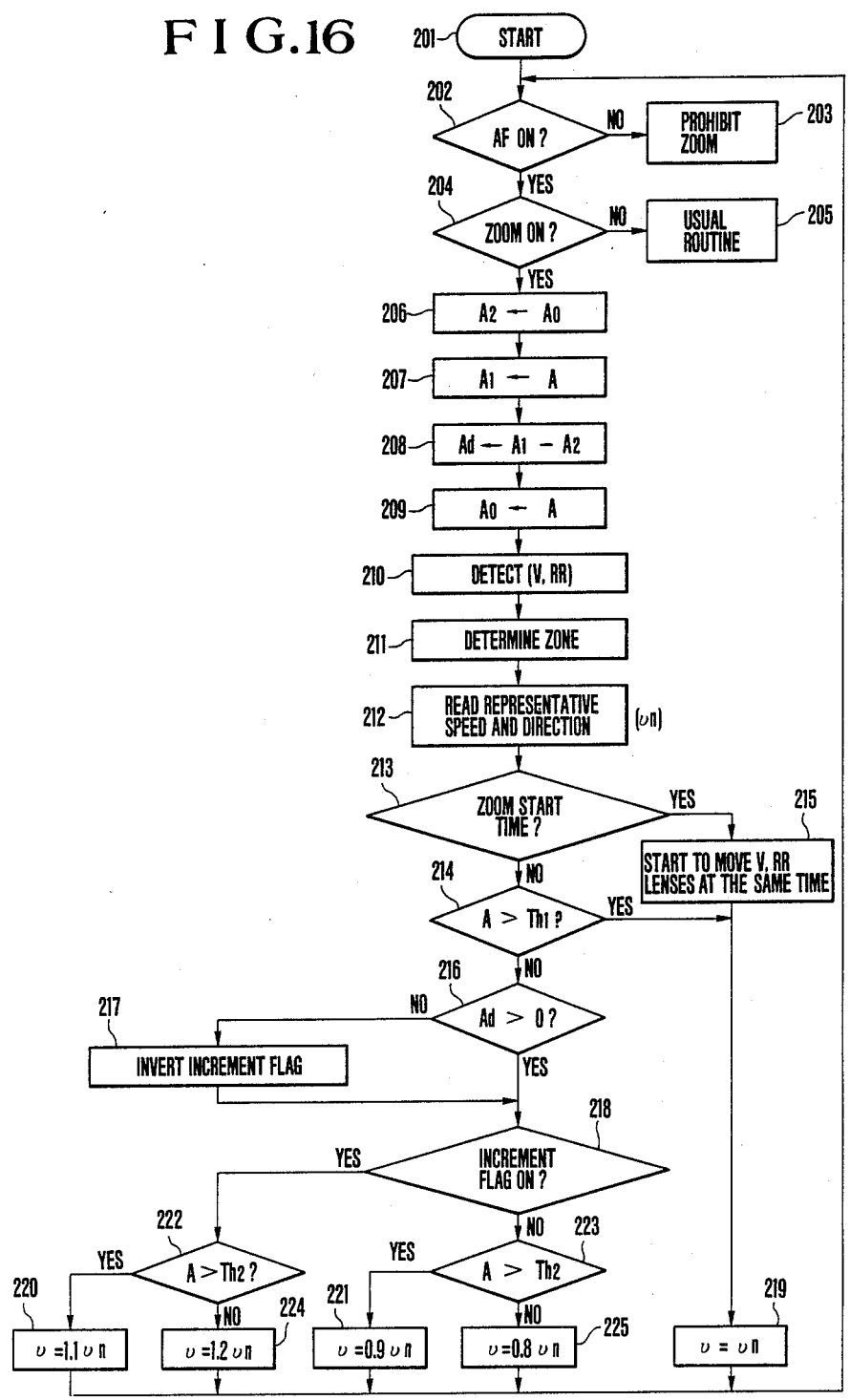
FIG. 16 is a flowchart showing another embodiment.

Referring next to FIG. 16, another embodiment of the invention will be described.

In this embodiment, the speed of the lens group (RR lens) 4B when in the out-of-focus state is more finely controlled. It is to be noted that this embodiment differs from the before-described embodiment only in parts of the flowchart. So, the other features of the mechanisms and the circuits will be described by using the drawings for the before-described embodiment.

By reference to FIG. 4, the relationship between the position of the RR and the defocus is now considered. The motion locus 22 of the RR lies on the far side of the ideal locus 23 found in correspondence to the object distance, or in the so-called far-focus state. When zooming from the telephoto side to the wide-angle side, therefore, if the RR is moved at a faster speed than the representative speed of the zone set in the zone I, the motion locus 22 of the RR rapidly approaches the ideal locus 23 so that the defocus is decreased. Also, the RR is not necessarily always in a near-focus position relative to the ideal locus 23. So there is some possibility of it existing on the minimum object side of the ideal locus 23 or in a near-focus position. If the moving speed of the RR is increased despite its presence in the near-focus position, the motion locus 22 of the RR goes far away from the ideal locus 23 with the result that the defocus gets greater. In this case, therefore, the moving speed of the RR should be slowed down.

So, if, as in the out-of-focus state, the defocus is outside an allowable range, the representative speed of the zone is corrected by increasing it or decreasing it so that the RR is moved at the corrected speed. If the defocus is then caused to increase, the corrected speed is reversely decreased, or increased. In such a way the in-focus state is attained. This constitutes a first feature of this embodiment. Yet, suppose the number of corrected values of the speed obtained by increasing or decreasing is limited merely to one, then when a relatively large defocus occurs, it will take a long time to reach the in-focus state. Conversely when the defocus is small, the motion of the RR is too rapid. So it may happen that the obtained picture becomes uncomfortable to view. A second feature is, therefore, that the rate of increase or decrease in correcting the speed is made changeable depending on the degree of defocus. In this embodiment, setting of a corrected speed is performed in steps 214 through 225 (except the steps 215 and 219) to be described below.

Figure 14A:
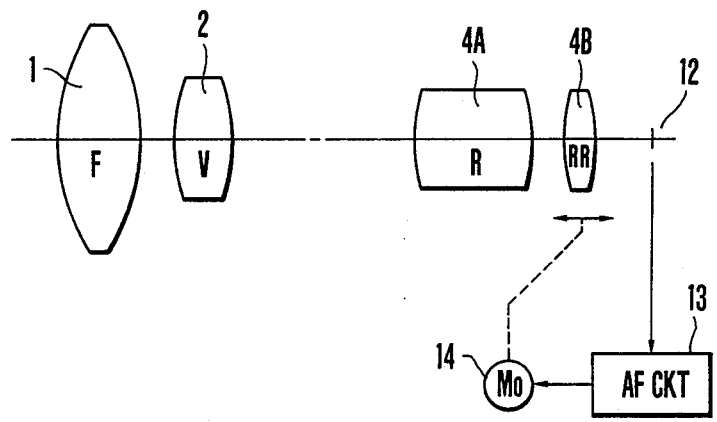
FIGS. 14(B)–14(D) are diagrams for explaining the AF principle.
Figure 14B:
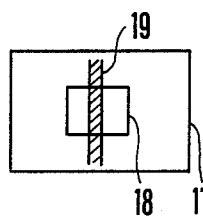
Figure 14C:
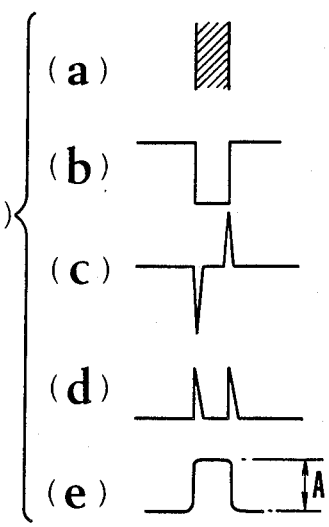
Figure 14D:
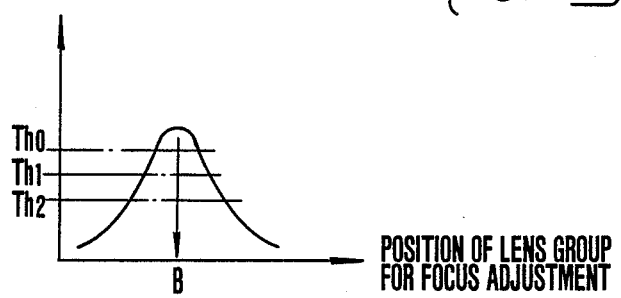

In the step 214, whether or not the evaluated defocus A is above the acceptable level $Th_1$ of defocus (set as shown in FIG. 14(D)) is determined. Here, if there is the relationship: $A > Th_1$, the defocus can be said to fall within an allowable range. That is, the image is in the in-focus state. Then $v = vn$ is set in the step 219. Thus, without having to perform correction, the RR is driven to move at the representative speed of the zone.

If the defocus is $A \leq Th_1$, on the other hand, the image can be said to be in the out-of-focus state. The signal of the Ad is then judged in the step 216.

That is, since $Ad > 0$ means that the degree of defocus has been reduced in a space of 1/60 sec. from the previous cycle to a present cycle, for the faster speed than the representative one of the zone, to correct the speed by increasing is right. Also, for a slower speed than the representative one of the zone, to correct the speed by decreasing is right. Therefore, the subsequent speed control may be performed by leaving the direction of correction unchanged. So, alteration of the increment flag is not carried out.

In the step 218, the same determination as in the previous cycle is made. If the RR is being moved at the corrected speed by increasing, the flow advances to a step 222. If the RR is being moved at the corrected speed by decreasing, the flow advances to a step 223.

In the step 222, whether or not the evaluated defocus A exceeds a level $Th_2$ (where $Th_2 < Th_1$) of defocus set as shown in FIG. 14(D) is judged. If the relationship: $A > Th_2$ is met, then, as degree of defocus is taken relatively small, the corrected speed is set to a value increased 10% from the representative value $vn$ of the zone, or $v = 1.1 vn$ in the step 220. If the relationship: $A \leq Th_2$ is met, then, as the degree of defocus is relatively large, the corrected speed is set to a value increased 20% from the representative one of the zone, or $v = 1.2 vn$, in a step 224.

In the step 223, if the degree of defocus is relative small, the flow advances to a step 221 where the corrected speed is set to a value decreased 10% from the representative one $vn$ of the zone, or $v = 0.9 vn$. If the degree of defocus is relatively large, the flow advances to a step 225 where the corrected speed is set to a value decreased 20% from the representative one $vn$ of the zone, or $v = 0.8 vn$.

In a general case, the moving speed of the RR is considered to be $v = k vn$. Letting the values of the coefficient k in the steps 220, 224, 221, 225 be denoted by $k_{220}$, $k_{224}$, $k_{221}$, $k_{225}$ respectively, the following relationships may be set forth:

$$k_{225} < k_{221} < 1 < k_{220} < k_{224}$$

or $$k_{224} < k_{220} < 1 < k_{221} < k_{225}$$

In this specific embodiment, as has been described above, they are taken at $k_{225} = 0.8$, $k_{221} = 0.9$, $k_{220} = 1.1$ and $k_{224} = 1.2$.

Meanwhile, if, in the step 216, $Ad \leq 0$ is determined, that is, the use of that corrected speed leads to an increase in the defocus, then the increment flag is inverted in the step 217. Then, a different selection from the previous one is made in the step 218. Either the step 222 and those that follow or the step 223 and those that follow are performed in a similar manner.

It is to be noted that though, in the above-described embodiment, the threshold for the evaluated defocus A use has been made of two values of levels $Th_1$ and $T_2$, the number of threshold values may otherwise be increased, for example, as further including the level Th₀ shown in FIG. 14(D), with the advantage that the RR is more smoothly moved to give the viewer a better impression of the picture.

Figure 12:
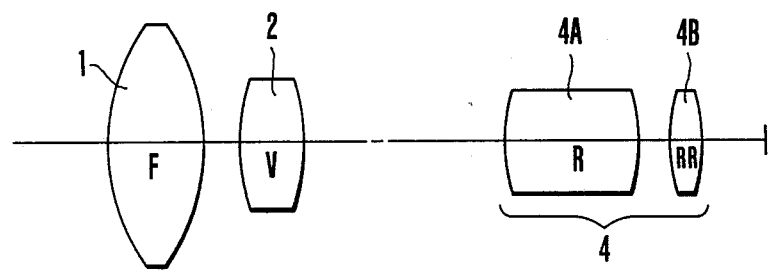
FIG. 12 is a block diagram showing the arrangement of the components of a zoom lens at which the application of the invention is aimed.
Figure 13:
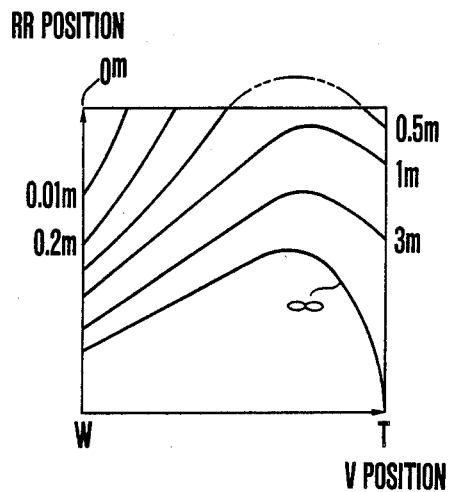
FIG. 13 is a graph showing the relationship of the relative positions of the variator lens (V) and the relay rear lens (RR) to each other in the zoom lens of FIG. 12 at every value of the object distance.
Figure 15:
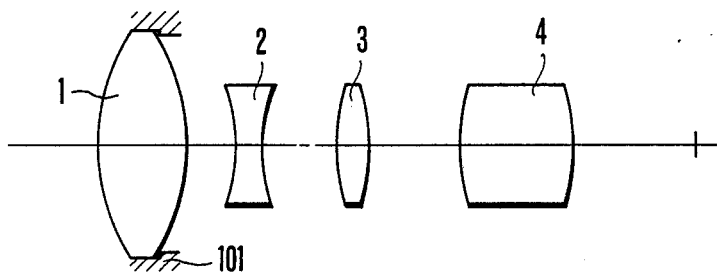
FIG. 15 is a block diagram of the arrangement of the components of another zoom lens according to the present invention.

It is also to be noted that though the lens type used is that shown in FIG. 12, the invention is applicable to any other lens types such as that shown in FIG. 15.

In the second embodiment shown in FIG. 16, particularly, the feature that the time necessary to regain the in-focus state can be shortened without causing the focusing to proceed very rapidly, has an advantage that a comfortable picture can be offered.

As another lens optical system to which the invention is applicable, mention may be made of types including, for example, a modification of the system of FIG. 12 where the lens group 4B and also the lens group 1 are made to move in an interlocking relation, and a modification of the system of FIG. 15 where the lens group 3, and the lens group 1 are made to move in an interlocking relation.

Also, the position detecting means for the variator lens and focusing lens (lens group 4B) may be of different forms from that used in the embodiments. For example, both of them may use respective individual encoders, or the method of determining them from the drive pulses for the respective motors may be used.

What is claimed is:

1. A lens position control device comprising:
(a) a first lens group movable along an optical axis for varying an image magnification;
(b) a second lens group for performing (1) a function of compensation when varying the image magnification, and (2) a focusing function;
(c) detecting means for detecting positions of said first lens group and said second lens group;
(d) a memory having stored therein moving speed information of said second lens group, said moving speed of said second lens group being stored in a plurality of kinds of moving speed information according to the positions of said first lens group and said second lens group and a predetermined moving speed of said first lens group; and
(e) control means for controlling movements of said first and said second lens groups in response to actuation for causing the image magnification to be varied, said control means selecting a specific moving speed from said memory depending on the positions of said first and said second lens groups detected by said detecting means, and causing said second lens group to move on the basis of said specific moving speed, and said control means causing said first lens group and said second lens group to move at almost the same time.

2. A device according to claim 1, further comprising focus detecting means for detecting whether said second lens group is in an in-focus position or in an out-of-focus position.

3. A device according to claim 2, wherein said control means corrects said special moving speed on the basis of information from said focus detecting means.

4. A device according to claim 2, further comprising means for prohibiting said first lens group from moving when said focus detecting means is inoperative.

5. A device according to claim 1, wherein said plurality of kinds of moving speed information for said second lens group stored in said memory are set plural by every change of the position of said second lens group relative to a predetermined position of said first lens group.

6. A device according to claim 1, wherein said plurality of kinds of moving speed information for said second lens group stored in said memory are set plural by every change of the position of said first lens group relative to a predetermined position of said second lens group.

7. A lens position control device comprising:
(a) a first lens group along an optical axis movable for varying an image magnification;
(b) a second lens group for performing (1) a function of compensation when varying the image magnification, and (2) a focusing function;
(c) detecting means for detecting positions of said first lens group and said second lens group; and
(d) control means responsive to a signal for causing the image magnification to be varied for moving said first and said second lens groups, said control means setting a moving speed of said second lens group on the basis of the positions of said first and said second lens groups detected by said detecting means, and causing said first and said second lens groups to move at almost the same time.

8. A device according to claim 7, further comprising: focus detecting means for detecting whether said second lens group is in an in-focus position or in an out-of-focus position.

9. A device according to claim 8, wherein said control means corrects said moving speed of said second lens group on the basis of information from said focus detecting means.

10. A lens position control device comprising:
(a) a first lens group movable along an optical axis for varying an image magnification;
(b) a second lens group for performing (1) a function of compensation when varying the image magnification, and (2) a focusing function;
(c) detecting means for detecting positions of said first lens group and said second lens group;
(d) focus detecting means for detecting a focus state of said second lens group;
(e) memory means for storing moving speed information of said second lens group, said moving speed information being stored in a plurality of kinds of moving speed information according to positions of said first and said second lens groups; and
(f) control means responsive to actuation for causing the image magnification to be varied for moving said first and said second lens groups, said control means selecting a specific moving speed from said memory means depending on the positions of said first and said second lens groups detected by said detecting means, and moving said first and said second lens groups at almost the same time, and said control means correcting said specific moving speed in accordance with a degree of out-of-focus when said focus detecting means has detected the out-of-focus.

11. A device according to claim 10, wherein when said focus detecting means has detected that the degree of out-of-focus is greater than a predetermined threshold level, said control means corrects a movement of said second lens group by increasing a speed of the movement.

12. A device according to claim 10, further comprising means for prohibiting said first lens group from moving when said focus detecting means is inoperative.

13. A device according to claim 10, wherein when the degree of out-of-focus has become greater during movements of said first and said second lens groups, said control means corrects said specific moving speed so as to bring said second lens group nearer to an in-focus direction.

* * * * *

UNITED STATES PATENT AND TRADEMARK OFFICE
CERTIFICATE OF CORRECTION

PATENT NO. : 4,920,369    Page 1 of 2
DATED : April 24, 1990
INVENTOR(S) : Kaneda, et al.

It is certified that error appears in the above-identified patent and that said Letters Patent is hereby corrected as shown below:

COLUMN 1:

Line 9, "Lenses" should read --Zoom lenses--.

COLUMN 3:

Line 1, "the" should be deleted.

Line 37, "Fig. 14(B)" should read --Figs. 14(B)--.

Line 38, "Figs. 14(B)" should read --Fig. 14(B)--.

COLUMN 5:

Line 15, "Fig. 1" should read --Figs. 1--.

COLUMN 8:

Line 11, "for" should read --performed--.

COLUMN 10:

Line 12, "a present" should read --the present--, and "the faster" should read --a faster--.

Line 28, "as degree" should read --as the degree--.

UNITED STATES PATENT AND TRADEMARK OFFICE
CERTIFICATE OF CORRECTION

PATENT NO. : 4,920,369

DATED : April 24, 1990

INVENTOR(S) : Kaneda, et al.

It is certified that error appears in the above-identified patent and that said Letters Patent is hereby corrected as shown below:

<u>COLUMN 12</u>:

Line 67, "direction" should read --position--.

Signed and Sealed this

Seventeenth Day of March, 1992

Attest:

HARRY F. MANBECK, JR.

*Attesting Officer*       *Commissioner of Patents and Trademarks*